TELEGRAPH SIGNAL ARRANGEMENT FOR A TELEPHONE SYSTEM

Filed Nov. 17, 1958 6 Sheets-Sheet 1

INVENTOR.
Robert E. Stoffels
BY C. A. Gulbrandsen
Atty.

INVENTOR.
Robert E. Stoffels
BY
C. A. Gulbrandsen
Atty.

Jan. 29, 1963 R. E. STOFFELS 3,076,056

TELEGRAPH SIGNAL ARRANGEMENT FOR A TELEPHONE SYSTEM

Filed Nov. 17, 1958 6 Sheets-Sheet 3

INVENTOR.
Robert E. Stoffels
BY
C. A. Gulbrandsen
Atty.

Jan. 29, 1963 R. E. STOFFELS 3,076,056

TELEGRAPH SIGNAL ARRANGEMENT FOR A TELEPHONE SYSTEM

Filed Nov. 17, 1958 6 Sheets-Sheet 4

INVENTOR.
Robert E. Stoffels
BY
C. A. Gulbrandsen
Atty.

INVENTOR.
Robert E. Stoffels
BY C. A. Gulbrandsen
Atty.

INVENTOR.
Robert E. Stoffels
BY
C. A. Gulbrandsen
Atty.

United States Patent Office 3,076,056

Patented Jan. 29, 1963

3,076,056

TELEGRAPH SIGNAL ARRANGEMENT FOR A TELEPHONE SYSTEM

Robert E. Stoffels, Oak Park, Ill., assignor to Automatic Electric Laboratories, Inc., a corporation of Delaware Filed Nov. 17, 1958, Ser. No. 774,212
28 Claims. (Cl. 179—3)

This invention relates in general to the transmission of telegraph signals over telephone lines and more particularly relates to arrangements for permitting transmission of telegraph signals responsive to the establishment of a connection between two telephone stations and to the means for signaling and controlling the response of the respective station.

Telegraph transmission between telephone stations, each equipped with telegraph transmitting and receiving equipment, has heretofore been accomplished over privately leased telephone lines; by having an operator extend a connection over a telephone line or by automatically establishing a connection from one station to another via common central office switching equipment. However, in any case, some manual supervision and control of the connection has been necessary before telegraph transmission or reception between stations can occur.

In the present invention a call from one station to another is established via conventional central office switching apparatus, and when the called station is rung, it responds by automatically transmitting a signal to the calling station. The signal, on being received at the calling station, causes the calling station to transmit a message to the called station, and when neither station has a message to transmit the connection is automatically released. In one arrangement of this invention message transmission occurs simultaneously in both directions, while in another arrangement transmission between stations occurs in sequence. In the second arrangement of the invention certain security controls are provided to ensure that messages are transmitted only to a proper station.

In the case of security controls, when the connection is established, a "Go Ahead" signal is transmitted to the calling station. This causes the calling station to transmit a series of telegraph signals comprising a code, which informs the called station that the calling station is part of a network associated with the called station. The calling station then transmits a "Go Ahead" signal to the called station. The called station in turn transmits a series of telegraph signals comprising a code, which informs the calling station that the called station is an associated network station. The called station then transmits a "Go Ahead" signal to the calling station, which now initiates transmission of the body of its message.

After the calling station has transmitted its message it transmits a "Go Ahead" signal to the called station, which, if it has a message to transmit, now transmits the same. In this fashion each station transmits to the other in sequence and when neither station has a message to be transmitted, the stations automatically release the connection.

In addition, each station in the second arrangement is provided with apparatus, whereby an attendant at one station may be signaled from another station and whereby one station may control the other station to permit or terminate transmission in accord with the needs of the situation.

It is therefore an object of the present invention to provide control equipment for use at telephone substations equipped with telegraph transmitting and/or receiving equipment whereby a connection is automatically established from a calling to a called station and the transmission and reception of telegraph signals over said connection is automatically controlled and supervised.

It is a further object of this invention to provide automatic signaling responsive to the establishment of a connection between two stations to permit one station to transmit telegraph signals to the other and vice versa.

It is a further object of this invention to provide for the simultaneous transmission in opposite direction of telegraph signals between two stations responsive to the automatic completion of a connection therebetween.

It is a further object of this invention to provide certain security controls whereby each station knows that it is permitted to transmit telegraph message characters to another station.

It is a further object of this invention to provide a system for the completely automatic transmission and reception of telegraph signals over telephone lines and also provide certain procedural sequences and controlling functions whereby an operator at one station can be signaled from another station or the operation of the apparatus at one station can be controlled from the other station.

A feature of this invention is the arrangement whereby control signals are automatically transmitted between two stations responsive to the automatic completion of a connection therebetween for enabling various telegraph functions to be completed at each station.

Another feature of this invention is the arrangement for automatically determining whether or not a station is a proper station to which messages are to be transmitted.

A further feature of this invention is the arrangement for controlling the telegraph equipment at each station responsive to certain signals which do not comprise telegraph message characters.

Other objects and features of this invention will become apparent in perusal of the following specification, claims, and associated drawings.

FIG. 1 shows one arrangement of the invention at station A whereby telegraph message characters are simultaneously transmitted to and received from a similarly equipped station B over a telephone line. In addition to the conventional telephone and telegraph equipment shown in FIG. 1, amplifiers, band pass filters and oscillators of well-known types are indicated by the marked blocks, whose function will be subsequently described.

Figure 7:
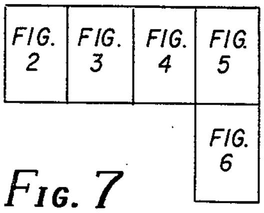
FIGURE 7 shows the composite relationship of FIGURES 2–6.

The equipment shown in station C utilizes, in addition to the conventional telephone and telegraph transmitting and receiving apparatus, a telegraph transmitter 290, a telegraph receiver 240, a signal receiver 230, and a function selector 690 in the security circuit 600. A portion of transmitter 290 and receivers 240 and 230 are illustrated in detail. The telegraph transmitter 290 actually comprises an oscillator tube 210 used for providing telegraph space mark signal frequencies under control of telegraph transmitter 270. It is of the type described in the Lenkurt Company Bulletin entitled "Telegraph Transmitter, Type 22AT," Form 22AT–S, Issue No. 2, dated May 1952, and associated drawings B–5968–01 and B–5968–02. The telegraph receiver 240 is of the type described in Lenkurt Bulletin entitled "FM Telegraph Receiver, Type 22AR," Form 22AR–S, Issue No. 5, dated May 1952, and associated drawing B–5194. It is used to convert received tone signals representing telegraph space and mark signals into pulses of direct current for operating a telegraph signal printer or recorder. In this case it is used to control a polar relay 250 of the type shown in FIG. 7 of the Automatic Electric Company Bulletin 453 entitled "Polar Relays" Series PTW, printed in U.S.A. by Brooks and Sons Company, October 1956, which in turn controls a telegraph signal recorder or printer magnet 255. Telegraph receiver 240 comprises two triodes 241 and 242, whose grid currents vary in accordance with received space or mark signals. A "No Tone" detecting circuit 265 having an amplifier 262 of any well known type for amplifying the grid currents resulting from the telegraph signals is provided for opertaing a relay 260. Relay 260 provides an indication that telegraph signals are being received at the station to prevent station time-out. The Signal Receiver 230 is of the type described in the Lenkurt Company Bulletin entitled "Signal Receiver, Type 443–A," Form 443–S, Issue No. 3, dated August 1951, and having associated drawing B–6447. It is arranged to respond to certain control tones transmitted thereto by releasing either relays 231 or 235 respectively dependent on the received control tone.

The function selector indicated by the block marked 690 in security circuit 600 is of the type shown and described in Patent 2,667,533, issued to W. J. Zenner on January 26, 1954, and more particularly shown and described in Bulletins No. 216B and 1149B entitled "Teletype Printing Telegraph Systems," "General Description and Theory of Operation," and "Parts" respectively issued by Teletype Corporation and copyrighted 1953. It is otherwise known as a function box, function selector mechanism, or stunt box and is associated with the telegraph signal recording arrangement. It is arranged to respond to a number of different code combinations, which may appear in a telegraph message, for closing contacts corresponding to each code combination.

Figure 1:
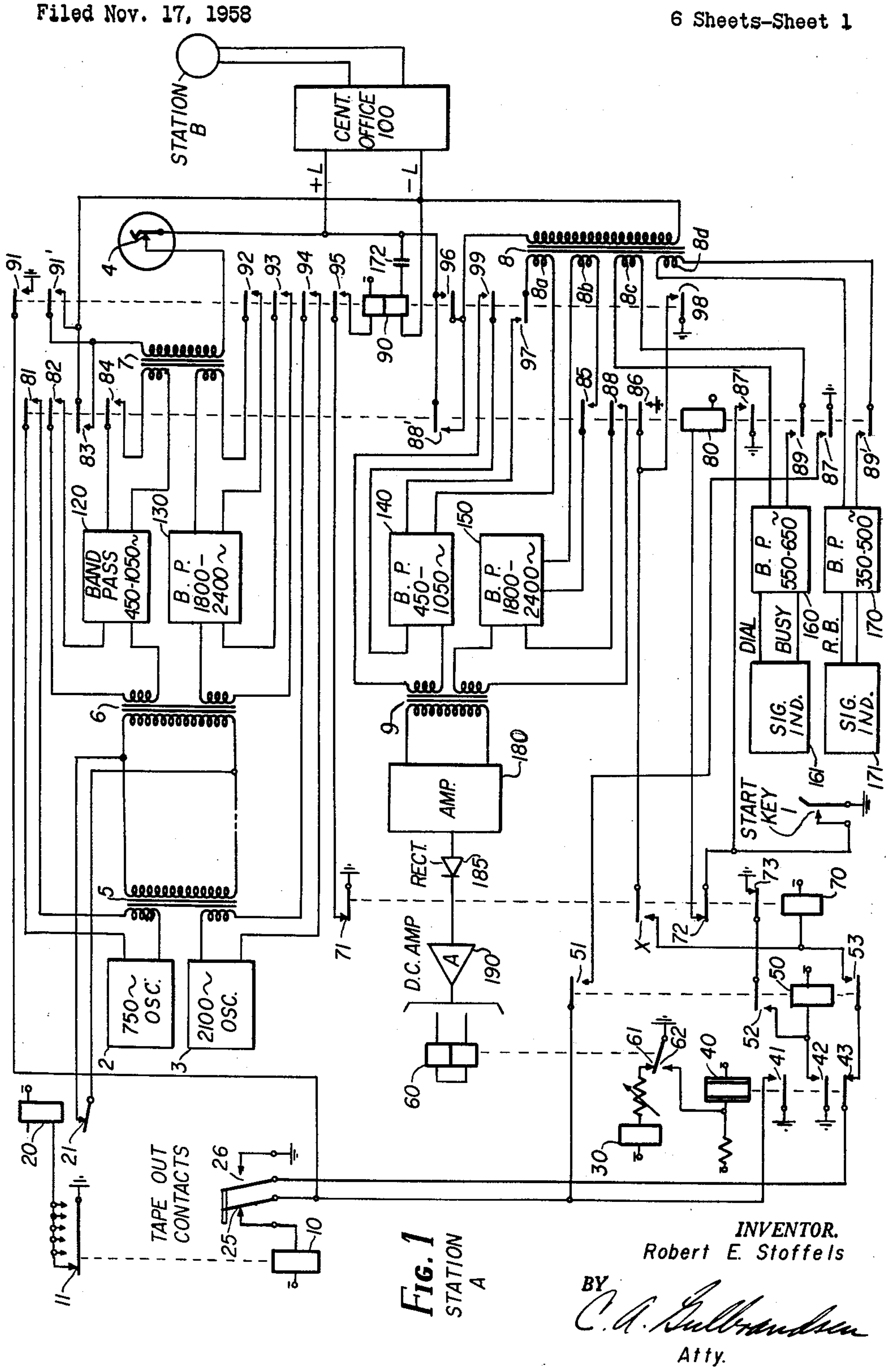
Figure 2:
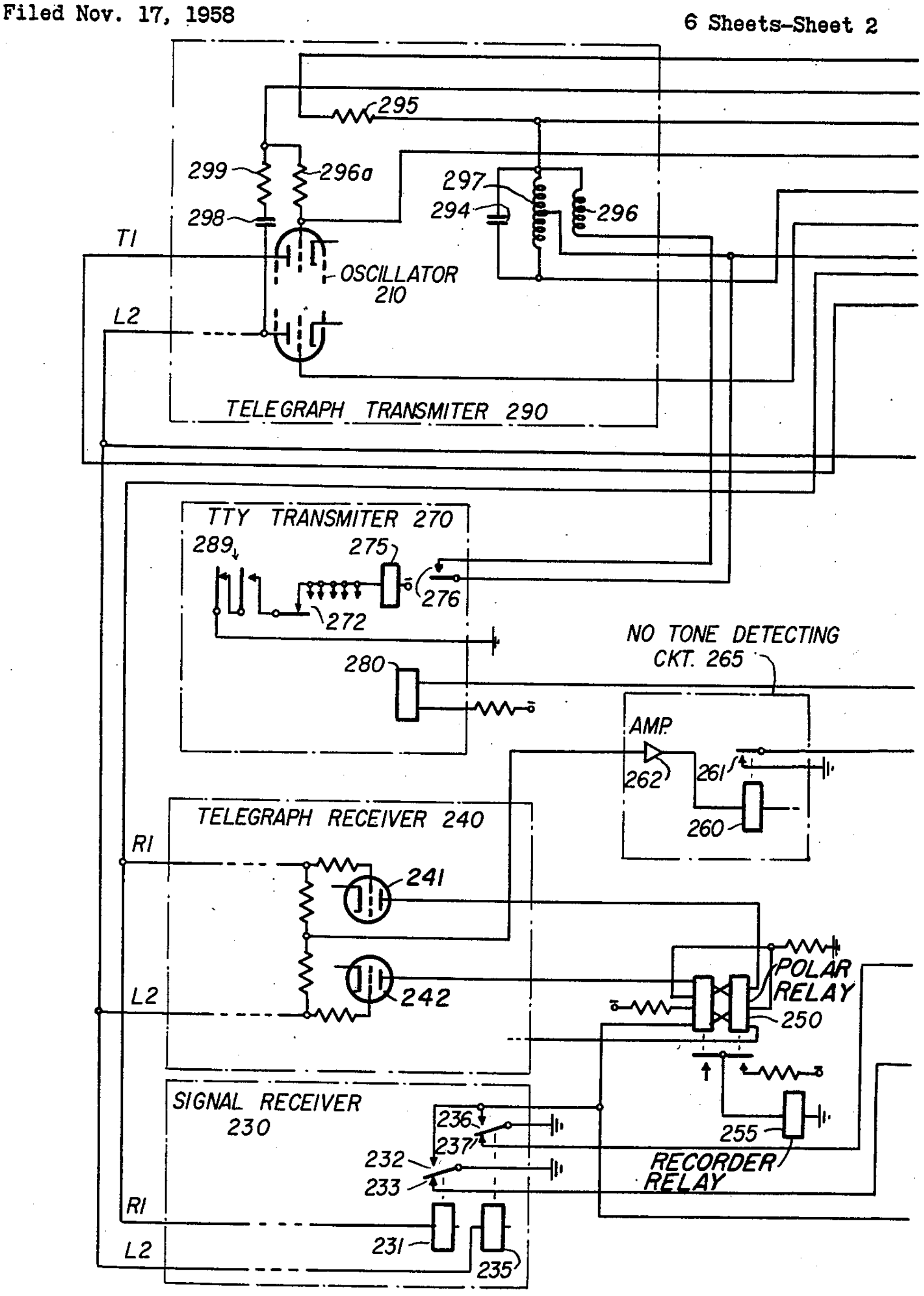
FIGS. 2–5 show another arrangement of the invention at station C, whereby transmission takes place in one direction at a time between station C and a similarly equipped station, station D, connected thereto over a telephone line.
Figure 3:
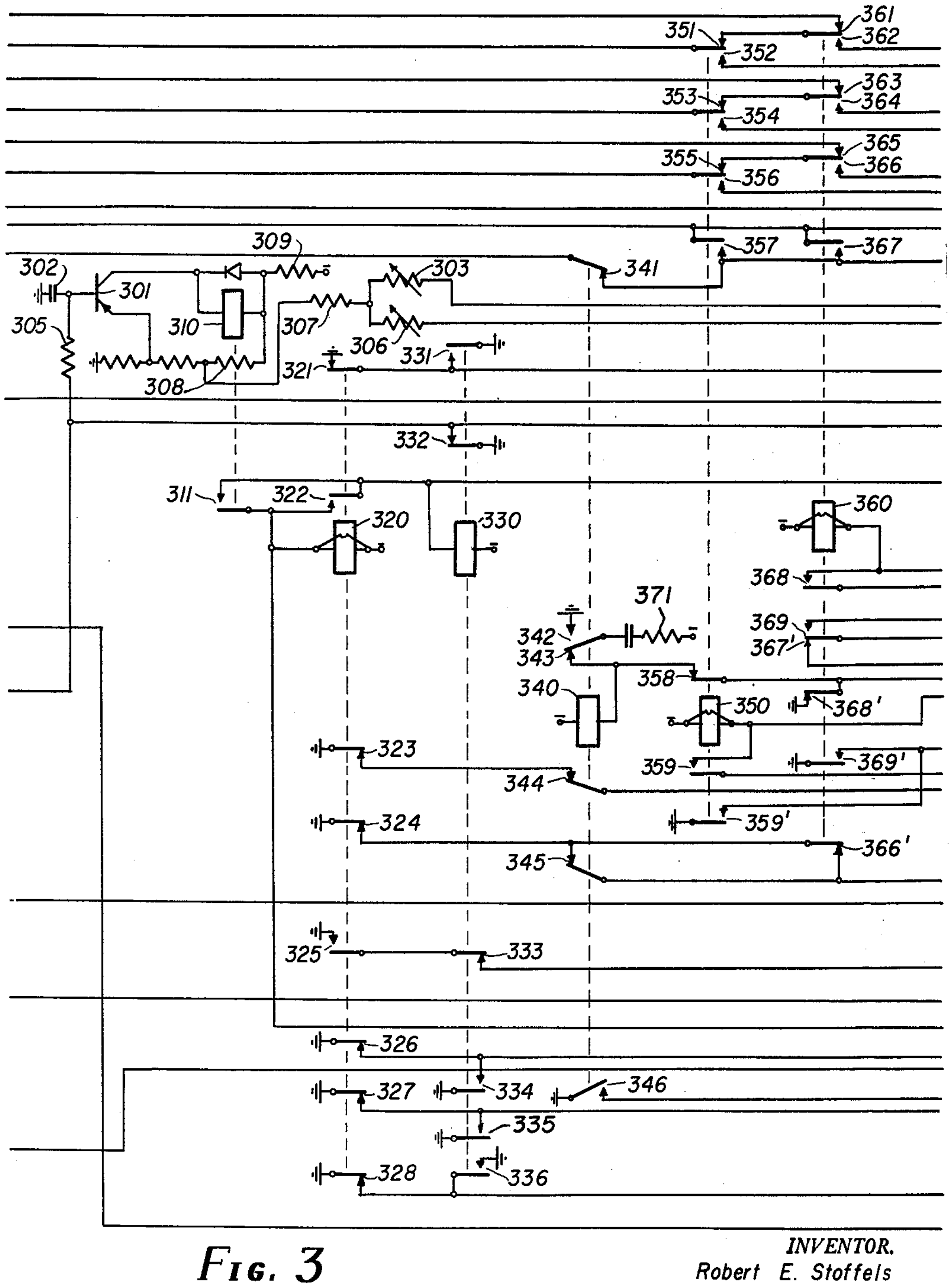
Figure 4:
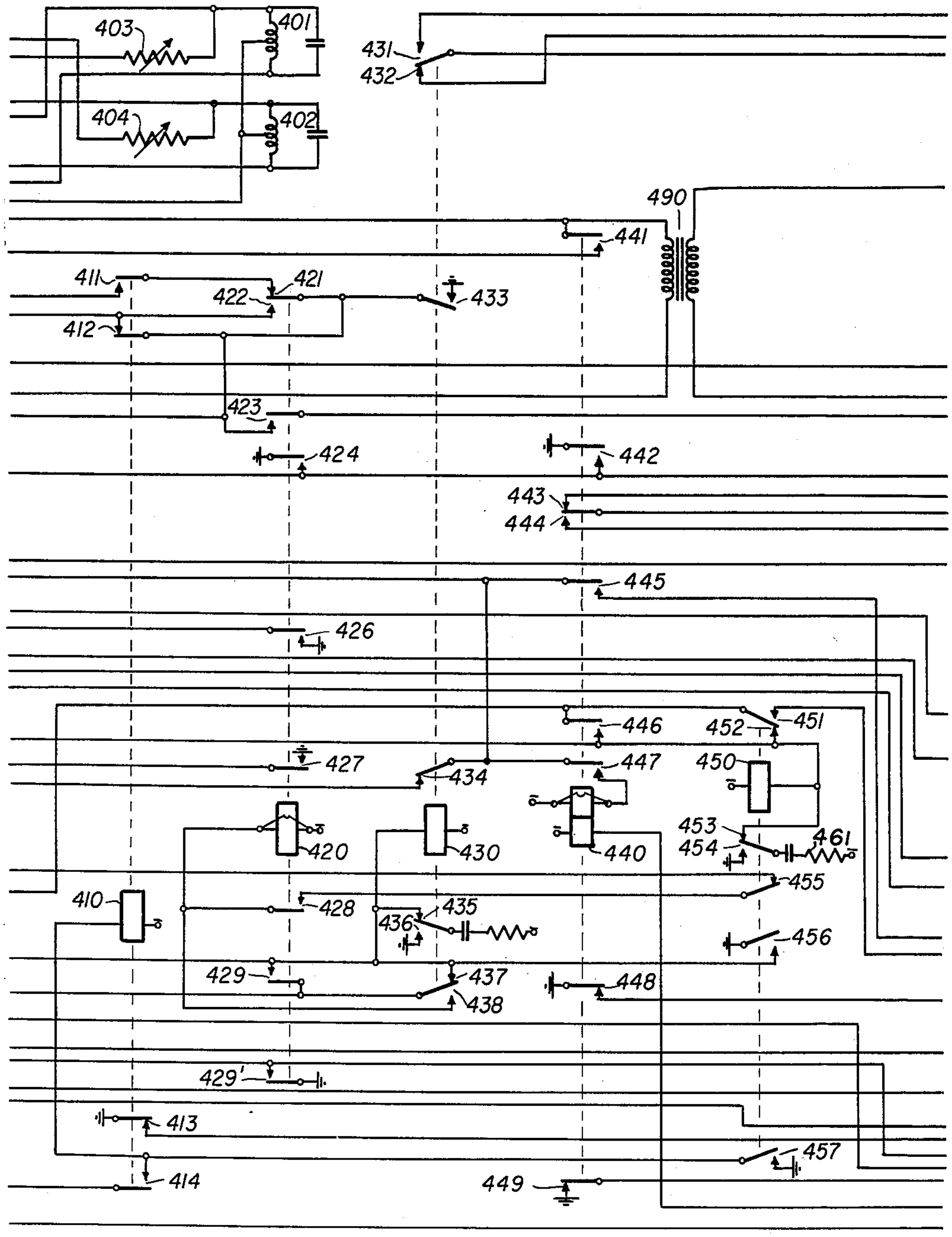
Figure 5:
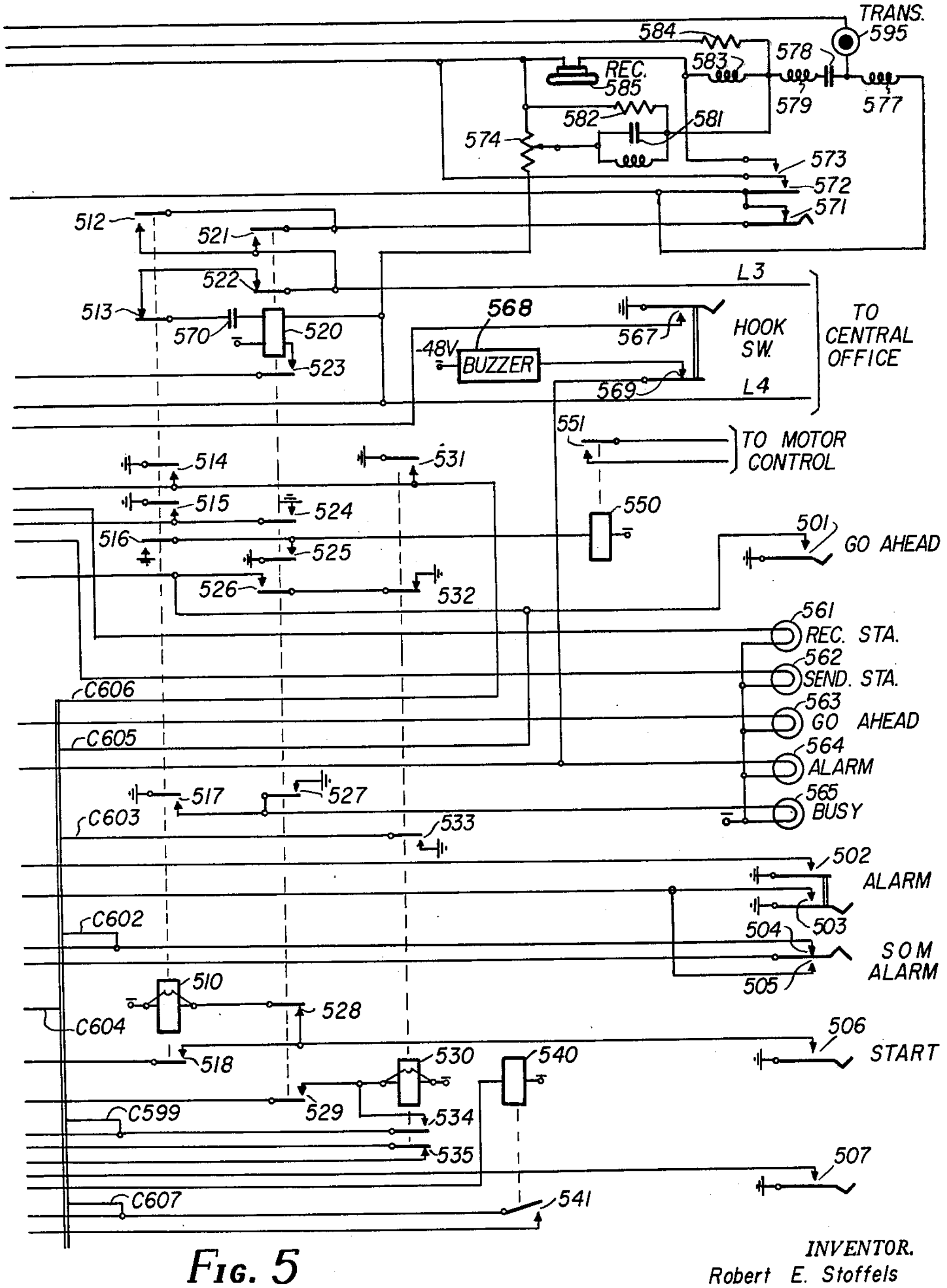

Briefly described, an operator at station A, which is shown in FIG. 1, on desiring to transmit a telegraph message to station B, for example, momentarily operates start key 1. This operates relay 80, which prepares a circuit to the transmitter clutch magnet 10, and connects the 450–1050 cycle band pass filter 120 between transformers 6 and 7. It connects the 1800–2400 cycle band pass filter 150 between transformers 8 and 9, and also completes the loop circuit to central office switching equipment. The operator may now dial the desired directory number of the called station by operation of dial spring contacts 4.

When the connection is completed, ringing current is extended to the called station, if it is idle, to operate a relay such as 90 at the called station.

This relay on operation connects the 1800–2400 band pass filter 130 between transformers 6 and 7 at the called station and connects the 450–1050 cycle band pass 140 between transformers 8 and 9. It also initiates operation of the telegraph transmitter 11 through relay 10 at the called station.

The transmitter at the called station will have either a tape perforated in accordance with a regular message to be transmitted to the calling station or a message tape perforated in a manner indicating that the station has no message. Polar relay 20 at the called station is operated accordingly to enable the output of the 2100 cycle oscillator 3 to be transmitted over the connection via the 1800–2400 band pass filter 130 in accordance with the message characters.

The first 2100 cycle tone received at the calling station is passed through band pass filter 150 at the called station to restore relay 60. This initiates operation of the transmitter 11 at the calling station. Relay 60 is controlled in accordance with the following received 2100 cycle tones to control the recording magnet 30 at the calling station for recording the received message.

With transmitter 11 at the calling station operating, its polar relay 20 is controlled in accordance with the message characters to apply the output of the 750 cycle oscillator in accordance with the message characters to the connection via the 450–1050 cycle band pass filter 120. Thus, the calling station is simultaneously both transmitting its telegraph message and receiving the called station's telegraph message.

The transmitted 750 cycle tone is passed through band pass filter 140 at the called station B to control the polar relay 60 at the called station in accordance with the transmitted message characters. Polar relay 60 in turn controls the teletypewriter recorder magnet 30 at station B in accordance with the received message characters. Thus, the called station is simultaneously transmitting its telegraph message and receiving the calling station's telegraph message.

When the message at either station has been completed, the tape is passed through the transmitter and the tape out contacts are operated to their tape out position. This terminates operation of the transmitter at the respective transmitting station. Relay 60 at the other station then remains operated. With relay 60 at each station remaining operated indicating the other station is no longer transmitting and the transmitter tape out contacts at each station in the tape out position, each station automatically releases from the connection.

In the other arrangement of the invention shown in FIGS. 2–6 an operator having a message to transmit operates start key contacts 506, to operate the calling relay 510. This completes a loop to the control office via repeating coil 490 so the operator can dial the desired station. On establishing a connection thereto, ringing current is transmitted to the called station for operating a called relay such as 520.

It in turn controls a tone signal relay 360. Relay 360 connects a tank circuit 402 and resistor 404 to oscillator tube 210 so that the telegraph transmitter 290 provides a 1740 cycle tone. Relay 360 also connects the output of telegraph transmitter 290 to repeating coil 490 which is connected across the line loop so that the 1740 cycle tone signal is transmitted to the signal receiver 230 at the calling station. This signal is also transmitted to the signal receiver 230 at the called station. The 1740 cycle tone signal comprises a "Go Ahead" signal and it remains on the line for a period of time determined by the release period relay 340, which is under control of relay 360.

At the calling station the receipt of "Go Ahead" signal by the signal receiver 230 causes restoration of relay 235, and, when the signal is terminated, the reoperation of relay 235 results in the operation of Teletype transmitter 270 at the calling station.

The tape at the calling station has perforated therein certain heading information including a network code and the calling station code. Relay 275, which is controlled by transmitter 270 in accordance with the tape perforations, controls the output of oscillator tube 210 so that a series of space and mark frequencies corresponding to the heading information is transmitted to the telegraph receiver 240 at the called station. Simultaneously the same information is picked up at telegraph receiver 240 at the calling station. Each telegraph receiver controls a No Tone Detecting Circuit 265 and a recording magnet 255 under control of a polar relay 250 to prevent the station from timing out.

Figure 6:
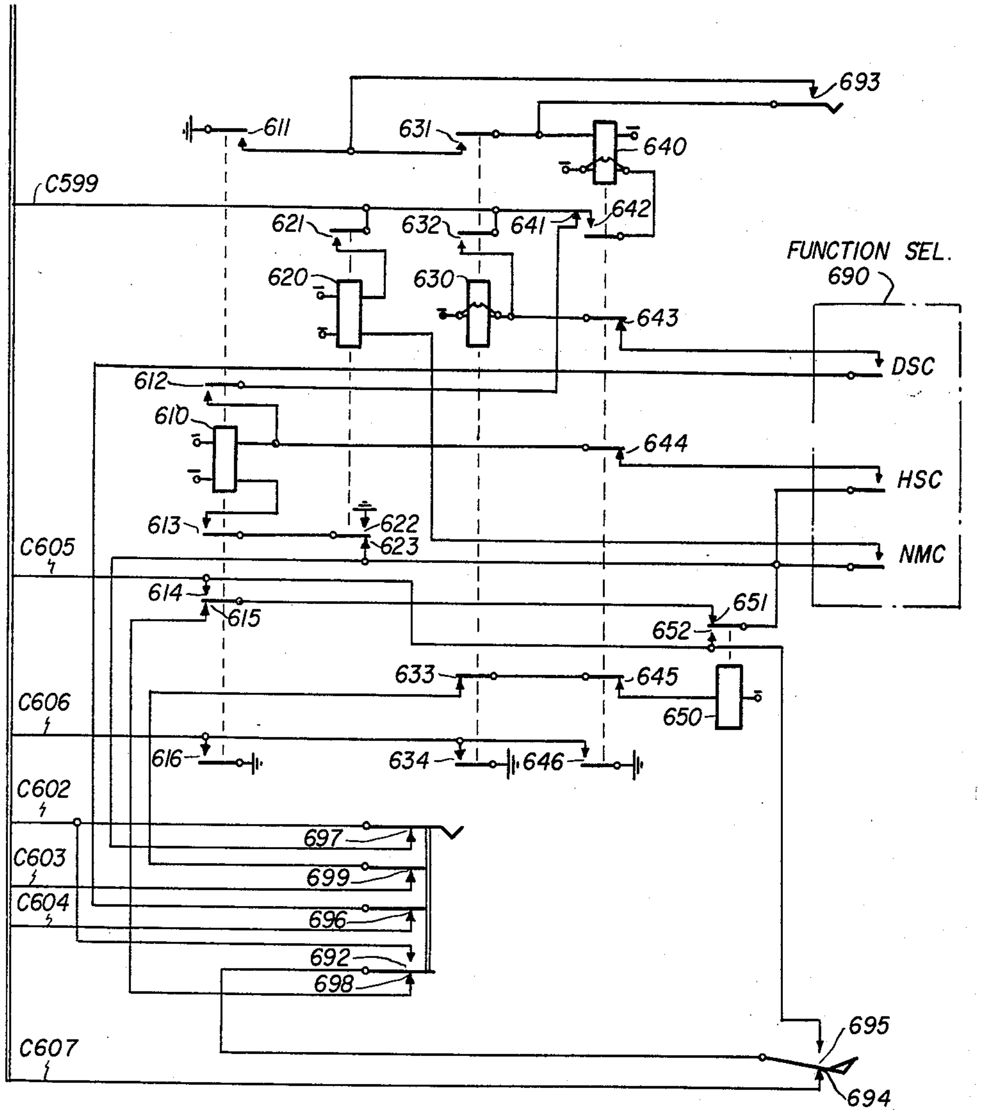
FIG. 6 shows a security circuit 600 for use at a station such as station C, shown in FIGS. 2–5, for ensuring that a connected station is a proper calling or called station, as the case may be.

The recording apparatus of each station operated by magnet 255 in response to the received telegraph signals each control a function selector indicated by the block marked 690 in FIG. 6. Each function selector closes contacts corresponding to the certain code combinations. At the called station function selector contacts DSC, corresponding to the distant station code or network code, close to operate relay 630 in response to the corresponding telegraph code signals. At the calling station contacts HSC corresponding to the home station code close to operate relay 610 in response to the corresponding telegraph code signals. Although both sets of function selector contacts close at each station, ground is extended to only one set at each station so that only that set is effective. Transmission of telegraph signals from the calling station is terminated in response to the operation of relay 610, and it now operates relay 360 at the calling station. The calling station now transmits the aforementioned "Go Ahead" signal to the called station.

Termination of the "Go Ahead" signal causes the called station transmitter 270 to initiate transmission. The tape at the called station also contains heading information similar to that described, except that in this case it contains the called station code.

The function selector at the calling and called station responding to the received telegraph signal closes contacts corresponding to the network and home station codes. At the calling station contacts DSC close to extend ground for operating relay 630 at the calling station, while at the called station contacts HSC close to operate the upper winding of relay 610. The called station terminates transmission of its heading information and then transmits a "Go Ahead" signal to the calling station. The calling station now transmits its telegraph message to the called station in response to the receipt of this "Go Ahead" signal from the called station.

At the end of the transmission of its message the calling station transmits a "Go Ahead" signal to the called station under control of relays 360 and 340. If the called station has a telegraph message to transmit, it now transmits the same.

If the called station does not have a telegraph message to transmit, it returns a "Go Ahead" signal to the calling station and that station, if it has another message to transmit, transmits the same. If not, it returns the "Go Ahead" signal to the called station. The back and forth signaling by means of the "Go Ahead" signals continues until condenser 302 at each station is charged to cause the collector emitter circuit of transistor 301 to draw current and operate relay 310. Relay 310 at each station then causes the respective station to release from the connection.

In the event of a trouble condition at either station, or, if desired, for any other reason, an operator can operate alarm key, contacts 503 and 502, or SOM alarm key, contacts 504 and 505, depending on the circumstances. This causes telegraph transmitter 290 to provide a low frequency 1640 cycle "Alarm" signal. Automatic signaling between the stations is terminated, and if there is an operator at the station to which the "Alarm" signal was transmitted, it alerts that operator and both operators may now converse. On clearing the trouble the "Go Ahead" key contacts 501 are operated from either station to cause relay 360 to transmit a "Go Ahead" tone to the other station. Transmission is thereupon resumed independently of the presence of an operator at the other station. If the condition is not cleared, the station time out and release from the connection, which may be reestablished to permit a station, which was receiving message information, to then transmit message information.

In addition, under certain circumstances it is desirable to the by-pass function of the security circuit 600. Under those circumstances either the message tape heading information at a particular station contains a special code corresponding to no message code or the key contacts 699, 698, 697, and 696 are opened and contacts 692 closed. When the function selector 690 is operated in accordance with the no message code heading information, the particular station is permitted to transmit to any calling station. Likewise, the operation of the key contacts 692 permits the station to transmit even though it has received an improper identification.

*Message Transmission Between Stations A and B*

Referring now to FIG. 1, an operator at station A having a telegraph message for transmission to station B, operates non-locking start key 1 momentarily. It completes a circuit over contacts 72 to operate relay 80.

Relay 80 closes contacts 81 to connect the 750 cycle tone oscillator 2 across the upper left winding of transformer 5. As contacts 21 on polar relay 20 are closed, the oscillations are not repeated across the transformer 6. Contacts 82 also close to connect the upper right winding of transformer 6 to the input circuit of the 450–1050 cycle band pass 120. At contacts 84 the output circuit of band pass 120 is connected to the upper left winding of transformer 7. At contacts 85 the input circuit of the 1800–2400 cycle band pass 150 is connected to winding **8*b* of transformer 8, and at contacts 88 the output circuit of band pass 150 is connected to the upper right winding of transformer 9. At contacts 88′ the right winding of transformer 8 is connected across the +L and −L conductors. At contacts 86 a circuit is prepared for relay 70, and at contacts 87 a circuit is prepared for the transmitter clutch magnet 10. At contacts 89 and 89′ the input circuit of 550 cycle band pass 160 and the 350–500 cycle band pass 170 respectively are connected to windings 8*c* and 8*d* respectively of transformer 8. At contacts 87′ relay 80 completes its own holding circuit over contacts 72 so that it remains operated after start key 1 is restored. At contacts 83 a circuit, including ground at the central office 100 extended over the +L conductor, dial springs 4, the right winding of transformer 7** and the −L conductor, is completed to battery through the line relay at the central office.

Switching equipment at the central office is now associated with the calling line in any well known manner. It returns dial tone in the neighborhood of 550 cycles to the +L and −L line conductors. This tone is transmitted through the 550–650 cycle band pass 160 by means of winding **8*c* on transformer 8. The band pass 160 is the only band pass at the calling station to pass the 550 cycle frequency. The 550 cycle frequency is then rectified and amplified in any well known manner to operate the signal indicator 161**, which informs the operator that she may operate her dial.

The operator, on operating her dial springs 4, controls the switching equipment at the central office 100 accordingly, in any well known manner, to connect the +L and −L conductors to a station such as station B having similar equipment to station A. The connector switch, which is included in the switch train at the central office 100, extends ringing current over a pair of conductors such as +L and −L extending from the central office 100 to the station B. Simultaneously, the connector switch returns 350–500 cycle ringback tone over the +L and −L conductors to station A. The ringback tone is picked up in winding **8*b* of transformer 8 and transmitted by the 350–500 cycle band pass 170 to operate signal indicator 171**. This informs the operator that the called station is being signaled.

The called station is furnished with apparatus similar to that at station A, and in referring thereto, the reference characters shown for the apparatus at station A will be used. At the called station the ringing current is extended through the lower winding of a relay such as 90 and a condenser such as 172 thereat to operate the relay. The relay 90 at the called station closes contacts 91 to extend ground over the transmitter tape-out contacts 25 to operate the clutch magnet 10 and the transmitter 11 at station B. At contacts 91′ it connects the right winding of transformer 7 across the line conductors. At contacts 92 and 93 it connects the output and input circuits respectively of the 1800–2400 cycle band pass 130 to the lower left winding of transformer 7 and to the lower right winding of transformer 6 respectively. At contacts 94 relay 90 connects the output of the 2100 cycle oscillator 3 to the lower left winding of transformer 5. At contacts 95 relay 90 completes a circuit for its upper winding to ground at contacts 71. At contacts 96 it connects the right winding of transformer 8 across the line conductors, and at contacts 97 connects the input circuit of the 450–1050 cycle band pass 140 to winding 8a on transformer 8. At contacts 98 it prepares a circuit to relay 70, and at contacts 99 connects the output circuit of the 450–1050 cycle band pass 150 to the upper right winding of transformer 9.

Contacts 96 and 91 at the called station on closing complete the D.C. loop to the connector switch ring cut-off relay, while the line cut-off relay maintains station B busy to incoming calls, all in any well known manner. The ring back tone is now cut-off to terminate operation of signal indicator 171 at the calling station. The transmission circuit between the calling and the called stations is now established.

With relay 90 at the called station operated, the 2100 cycle oscillator 3 is effectively connected to transformer 5. The operated transmitter clutch magnet 10 at the called station initiates operation of the transmitter 11. The tape in the transmitter is perforated either in accordance with a particular message information for the calling station or with a message indicating that the called station has no message for the calling station. With the transmitter 11 at the called station operating, the polar relay 20 responds in accordance with the tape perforations representing the message characters to operate contacts 21 accordingly. Therefore, tone spurts of 2100 cycles corresponding to the message characters are effectively placed across transformer 6, and passed by the 1800–2400 cycle band pass 130 at the called station and extended from transformer 7 to the transmission circuit extending to the calling station.

The first received burst of 2100 cycle tone at the calling station A is picked up by winding 8b on transformer 8 and extended through the 1800–2400 cycle band pass 150 to transformer 9. It is then amplified by amplifier 180, rectified by rectifier 185, and again amplified by the D.C. amplifier 190 and extended to operate the polar relay 60 all in any well known manner. Polar relay 60 responds to the first tone signal from the called station by opening contacts 61. This causes the teletypewriter reperforator or page-printer magnet 30 to respond for reperforating a tape or printing the message, as the case may be. Polar relay 60 also closes contact 62 to operate slow-to-release relay 40. Polar relay 60 continues to respond to incoming signals from the called station to operate magnet 30 in accordance with the received signals. Relay 40 remains operated between signals and for some time after the last signal is received, due to its slow-to-release characteristics.

Relay 40 at the calling station closes contacts 41 to extend ground past the tape-out contacts 25 to energize the clutch magnet 10 of the transmitter 11 at calling station. This causes operation of the transmitter 11, and polar relay 20 at the calling station responds to the message perforations in the tape to control contacts 21 in accordance with the message characters. Thus, a series of 750 cycle tones corresponding to the message characters are transmitted from oscillator 2, across transformers 5 and 6, the 450–1050 band pass 120, the transformer 7 and over the transmission circuit to the called station. Relay 40 also closes contacts 42 to complete a circuit to relay 50 and at contacts 43 opens a point in a possible circuit to relay 70. Relay 50 closes contacts 51 to extend an alternate energizing circuit to clutch magnet 10 over contacts 87 and tape-out contacts 25. At contacts 52, relay 50 completes its own holding circuit to contacts 73, and at contacts 53 prepares a circuit to relay 70.

The first burst of 750 cycle tone is received at the called station B and as only the 450–1050 cycle receiving band pass 140 therein is effective, this tone is transmitted from transformer 8 via winding 8a to transformer 9. It is then amplified, rectified, and amplified again to operate a polar relay such as 60 at the called station in the same manner as described for the 2100 cycle tone, when received at the calling station.

Polar relay 60 at station B responds to the incoming tone signals, corresponding to the message characters, to pulse contacts 61 accordingly and operate magnet 30 at the called station for recording the message characters. It also closes contacts 62 to operate a slow-to-release relay 40 at the called station B. Relay 40 in turn completes an alternate circuit over contacts 41 and tape-out contacts 25 to the transmitter clutch magnet 10 at the called station. At contacts 42 it operates relay 50 at the called station which locks operated over contacts 52 and 73. As contacts 87 at the called station are open, no circuit to the clutch magnet 10 is completed when the contacts 51 close.

Assume now that the message being transmitted from the called station B is terminated first. The tape-out contacts 25 thereat open and tape-out pins 26 close. Contacts 25, on opening, restore clutch magnet 10 to terminate further operation of the transmitter. Polar relay 20 therefore maintains contacts 21 closed to effectively shunt the 2100 cycle tone from the line. Ground at contacts 26 is extended towards contacts 43. However, relay 40 at the called station remains operated due to the operation of relay 60 by the receipt of the 750 cycle tone corresponding to message characters from the calling station.

At the calling station termination of the receipt of the 2100 cycle tone causes relay 60 therein to maintain contacts 61 closed and contacts 62 open. Relay 40 at the calling station A, therefore, eventually restores. It opens contacts 41 to restore one circuit for the transmitter clutch magnet 10. The transmitter clutch magnet, however, remains operated over contacts 87, 51, and 25. At contacts 42 the original operating circuit for relay 50 is opened. However, it remains operated over its holding circuit. At contacts 43 a circuit is prepared for relay 70.

When the message being transmitted from the calling station A is ended, the tape-out contacts 25 thereat open to restore the clutch magnet 10. Polar relay 20 thereafter maintains contacts 21 closed to shunt the 750 cycle tone from the transmission circuit to station B. Tape-out contacts 26 close simultaneously with the opening of tape-out contacts 25 to extend ground past contacts 43 and 53 to relay 70. Relay 70 closes its "X" contacts to complete its own holding circuit from contacts 86 at the calling station. At contacts 72 it opens a circuit for relay 80, which restores, while at contacts 73, relay 70 opens a circuit for relay 50. Relay 50 therefore restores. With relay 80 restored the holding circuit for relay 70 is opened and it restores. The calling station A is now in its unoperated condition similar to its condition before a connection was established to station B.

At the called station B polar relay 60 maintains contact 62 open, as incoming signals are no longer received at the called station. Relay 40 at the called station therefore restores after a period of time to open contacts 41 and contacts 42. These contact openings are without effect at this time. Contacts 43 also close to extend ground from the tape-out contacts 26 past contacts 53 to operate relay 70 at the called station. Relays 80, 50, and 70 are thereafter restored as described for the calling station A and the called station is restored to its idle condition. At contacts 71 the holding circuit of the upper winding of relay 90 is opened and relay 90 restores its contacts. At contacts 98 it opens a holding circuit for relay 70, which restores. The called station B is now returned to its idle condition.

Assume now that transmission from the calling station is terminated before the transmission from the called station. The tape-out contacts at the calling station are operated. Tape-out contacts 25 open to deenergize clutch magnet 10 at the calling station. Transmission of the 750 cycle tone signals to the called station, therefore, is terminated. At tape-out contacts 26 ground is extended towards contacts 43, which are open, as relay 40 is still operated at the calling station.

At the called station relay 60 maintains contacts 62 open as message signals are no longer received. Relay 40 opens contacts 41 to open one circuit for the clutch magnet at the called station B. However, the clutch magnet is maintained operated over contacts 91 and tape-out contacts 25. At contacts 42 the operating circuit for relay 50 is opened. However, the relay remains operated over its holding circuit. At contacts 43 a circuit is prepared for relay 70 at the called station.

When message transmission from the called station is terminated, tape-out contacts 25 open. This opens a circuit to the clutch magnet 10 at the called station B to terminate transmission of the 2100 cycle tone. Tape-out contacts 26 at the called station close to extend ground over contacts 43 and 53 to operate relay 70. Relay 70 closes its "X" contacts to complete a holding circuit for itself from ground at contacts 98. At contacts 71 it opens a circuit to the upper winding of relay 90 which restores to open contacts 98 and restore relay 70. In the meantime, contacts 73 open to restore relay 50. The called station is now restored to its idle condition.

At the calling station termination of the transmission of message signals results in the restoration of relay 40 as already explained. With tape-out contacts 26 closed, relay 70 at the calling station A is operated to complete an aforedescribed sequence of operation for restoring relays 80 and 50 and 70. The calling station A is now restored to its idle condition.

*Establishing Connection From Station C*

Station C incorporating the other embodiment of the invention is shown in FIGS. 2–6. Station C has access via line conductors L3 and L4 to a central office (not shown). Before establishing a connection to a called station, the operator at station C operates the non-locking start key contacts 506. This extends ground over contacts 528 to operate relay 510.

Relay 510 closes contacts 518 to complete its own holding circuit over contacts 528, 518 and 326. At contacts 517 it lights busy lamp 565, and at contacts 516 operates relay 550. At contacts 515 relay 510 extends ground past contacts 443 to light the receive station lamp 561. At contacts 514 it extends ground to relay 330 for operating relay 330. At contacts 513 the answer relay 520 is disconnected from across the line conductors L3 and L4. At contacts 512 a conventional line loop is completed over a circuit including conductor L3, contacts 512, dial springs 571, the right winding of repeating coil 490, and the L4 conductor. Central office switching equipment is now associated with the line conductors L3 and L4 in any well-known manner. This permits the operator to extend a connection to a desired station by operating dial springs 571 in accordance with the desired station's number. The connection, of course, may be established via one or more offices to the desired called station at which is located equipment of the same nature as that at station C. It will be noted that receiver 585 and coil 583 are normally connected in shunt with resistor 584 and 582 respectively and filter 581 respectively across the line conductors L3 and L4 via resistance 574, contacts 432, coil 579, condenser 578, coil 577, and contacts 512 to permit the operator to hear various signal tones such as dial tone. When the dial springs 571 are operated, dial off-normal springs 572 and 573 are closed in any well known manner to shunt the receiver 585.

Relay 550, on operating, closes contacts 551 to initiate operation of the teletypewriter equipment driving motors in any well-known manner. Relay 330, operating under control of relay 510 as described, closes contacts 331 for no purpose at this time. It opens contact 332 to enable condenser 302 and transistor 301 to begin a timing function which will be explained hereinafter. At contacts

333 relay 330 opens one circuit for operated relay 430. Relay 430 remains operated over contacts 437 and 233. At contacts 334 relay 330 provides another holding ground for relay 510. At contacts 336 relay 330 prepares a holding circuit for relay 410.

With the connection established to the called line, ringing current is extended to the called station in any well-known manner, if the called station is idle. At the called station the upper winding of the relay corresponding to 520 is connected across conductors such as L3 and L4 via contacts such as 522 and 513 and condenser 570. The relay at the called station corresponding to 520 operates from the ringing current. It and other apparatus at the called station will hereinafter be referred to by reference characters corresponding to those at station C.

At the called station relay 520 closes contacts 521 to connect the right winding of repeating coil 490 at the called station across the line conductors in a manner similar to that described for repeating coil 490 at station C. This completes a D.C. loop to the switching equipment and cuts-off the ringing current in any well known manner. At contacts 522 relay 520 opens its own circuit, and at contacts 523 completes a circuit for its lower winding from ground at contacts 321. At contacts 524 relay 520 extends ground over contacts 443 to operate the receiving station lamp 561, and at contacts 525 it extends ground to relay 550 at the called station. This relay closes contacts 551 to initiate operation of the teletypewriter motors. At contacts 526 ground is extended from contacts 532 to operate relay 360 and it is also extended over lead C605 to the security circuit 600. At contacts 527 the busy lamp 565 at the called station is operated, and at contacts 528 a possible circuit to relay 510 at the called station is opened. At contacts 529 a circuit is prepared to relay 530 at the called station.

*"Go Ahead" Signal Transmission*

Relay 360, on operating, opens contacts 361 and 363 to disconnect resistor 295 from resistor 299 and condenser 298 and the plate circuit of the lower triode of oscillator tube 210. Resistor 295 is normally connected over contacts 353, 363, 361, and 351 in shunt with resistor **296*a* in the feed-back path extending from the plate circuit of the lower triode to the grid circuit of the upper triode of tube 210. At contacts 362 and 364 relay 360 connects resistor 404 in shunt with resistor 296*a* to provide a new feed back circuit between the lower and upper triodes of tube 210. At contacts 365 tank circuit 294 is disconnected from between the triodes of tube 210, and at the contacts 366 the tank circuit 402 is connected therebetween to cause tube 210 to provide output oscillations at 1740 cycles. At contacts 367 lead T1 from tube 210 is connected from contacts 341 to the left winding of repeat coil 490. With repeat coil 490 connected across tube leads T1 and L2, the output of oscillator tube 210 is extended over repeat coil 490 to provide a 1740 cycle "Go Ahead" signal to the line conductors L3 and L4 extending back to the calling station. At contacts 368, relay 360 completes a holding circuit for itself over contacts 434, 344, and 323. At contacts 369 a circuit is prepared to the "Go-Ahead" lamp 563, and at contacts 367′ a point is opened in an incomplete circuit to alarm lamp 564. At contacts 368′ a circuit extending to relay 340 is opened. Relay 340 is held operated for a period of time determined by the time constant of the condenser and resistor combination 371 connected thereto over contacts 343, and then it restores. At contacts 369′ relay 360 completes an alternate circuit over contacts 452 for normally operated relay 450**.

At contacts 341 relay 340 on restoring disconnects the output of oscillator tube 210 from the repeat coil 490 to terminate the 1740 cycle "Go Ahead" signal transmitted to the calling station. At contacts 342 a charging circuit is provided for the condenser and resistor used for holding relay 340 operated. At contacts 344 the holding circuit for relay 360 is opened. At contacts 345 a point in an incomplete holding circuit for relay 420 is opened. At contacts 346 ground is extended past contacts 529 to operate relay 530.

Relay 530 closes contacts 534 to complete its own holding circuit from ground at contacts 327. At contacts 535 it opens one circuit for the bias winding of the polar relay 250 at the called station. At contacts 533 ground is extended over lead C603, key contacts 699 and contacts 633 and 645 to operate relay 650. Relay 650 opens contacts 651 and closes contacts 652. This prevents the completion of a circuit to the transmitter clutch magnet 280 at the called station, until relay 650 is restored. Thus, until relay 650 is operated as a result of the called station receiving the proper identification, the called station cannot transmit message characters. At contacts 531 relay 530 extends ground to operate relay 330. At contacts 532 relay 530 opens the original operating circuit for relay 360, which restores to terminate transmission of the 1740 cycle "Go Ahead" signal.

Relay 330, at the called station, on operating, closes contacts 331 to provide an alternate holding ground for the lower winding of relay 520. At contacts 332 it removes the source of ground potential applied to the base circuit of transistor 301 and condenser 302 to permit condenser 302 to charge, as will be hereinafter explained. Relay 330 opens contacts 333 which has no immediate effect. It closes contacts 334 which has no effect, as relay 510 at the called station, is unoperated. At contacts 335 it completes an alternate holding circuit for relay 530 over contacts 534. At contacts 336 relay 330 prepares a holding circuit for relay 410.

In addition to being transmitted to the calling station, the 1740 cycle "Go Ahead" signal is also extended in an obvious manner over conductors R1 and L2 to telegraph receiver 240 and signal receiver 230 at the called station. The telegraph receiver does not respond to the 1740 cycle signal. The output of signal receiver 230 is coupled to relay 235 so as to restore relay 235 in response to the 1740 cycle signal.

At contacts 237 relay 235 opens the original operating circuit for relay 450. However, it is held operated over contacts 369', until relay 360 restores to terminate the "Go Ahead" signal. When the "Go Ahead" tone signal is terminated, relay 235 reoperates to complete the original circuit for relay 450, while relay 360 restores, as explained. At contacts 236 relay 235 maintains the bias winding of polar relay 250 energized, while the "Go Ahead" signal is transmitted. This prevents the magnet armature from shifting position in response to spurious impulses.

*"Go Ahead" Signal Receipt*

The 1740 cycle "Go Ahead" signal is transmitted from the called station via the transmission circuit and conductors L3 and L4 extending to the right winding of repeating coil 490 at the calling station, and is transmitted via the left winding of the repeating coil 490 connected across conductors R1 and L2 to the signal receiver 230 and the telegraph receiver 240. The high tone signal relay 235 responds to the change in output of receiver 230 by restoring, but the telegraph receiver 240 does not respond to the signal and relay 260 remains unoperated.

Relay 235 restores to close contacts 236 and apply ground to the bias winding of the polar relay 250. Contacts 237, on opening, remove ground from relay 450 at the calling station. Relay 450 is held operated for a period of time by the condenser resistor network 461 connected thereto over contacts 453. It releases before the "Go Ahead" signal is terminated.

On restoring, relay 450 closes contacts 454 to recharge the condenser and also closes contacts 451. Contacts 451 prepare a circuit for the lower winding of relay 440. At contacts 456, relay 450 completes another circuit for relay 430 to hold it operated. At contacts 455 it opens a point in an incomplete holding circuit for relay 420.

At contacts 456 another circuit is completed to normally operated relay 430. At contacts 457 a circuit is completed to relay 410.

Relay 410 closes contacts 414 to complete its holding circuit from both contacts 328 and 336. At contacts 412 a point in the one minute delay circuit for charging condenser 302 is opened, and at contacts 411 the 10 second delay circuit for charging condenser 302 is completed. At contacts 413 ground, which was extended past contacts 535, is removed from the bias winding of polar relay 250. This will permit the relay to respond to signals representing telegraph characters, as soon as relay 235 reoperates.

At the termination of the 1740 cycle "Go Ahead" signal transmitted from the called station, relay 235 is reoperated. Relay 235 closes contacts 237 and extends ground to contacts 451. At contacts 236 it removes ground from the bias winding of the polar relay 250.

The ground extended to contacts 451 is extended past the SOM alarm key contacts 504, lead C602, key contacts 697, contacts 651 and 615, key contacts 698, and the transmitter tape-out contacts 694 to lead C607 to energize the lower winding of relay 440. Relay 440 operates to close contacts 445 to extend its operating ground from key contacts 504 towards contacts 368. This ground and ground from contacts 323 extended past contacts 344 and 434 are extended past contacts 447 to the upper winding of relay 440, which now energizes. The ground from contacts 323 is also extended from contacts 445, over lead C602, key contacts 697, contacts 651 and 615, key contacts 698 and tape out contacts 694 to lead C607. At contacts 446, the operating ground for the lower winding of relay 440 is extended to reoperate relay 450. Relay 450, on reoperating, opens contacts 451 to disconnect the ground at contacts 237 from leads C602 and C607. However, the ground from contacts 323 is now forwarded thereto. At contacts 448 ground is removed from lead C604 extending to security circuit 600. At contacts 449 the circuit for normally operated relay 540 is opened. At contacts 444 ground from contacts 515 is extended to light the sending station lamp 562. At the same time contacts 443 open to extinguish the receive station lamp 561. At contacts 442 another circuit is completed for relay 330. At contacts 441 the left winding of repeat coil 490 is connected through contacts 341 across the T1 and L2 conductors so that the output of telegraph transmitter 290 at the calling station is extended thereto.

Relay 540, on restoring, extends the ground on lead C607 past contacts 541 to the clutch magnet 280 of the transmitter 270. The transmitter now operates to advance the tape. Relay 450 reoperating, as explained, opens the original operating circuit for relay 440 at contacts 451. Relay 440, however, remains operated from the ground at contacts 323 to extend ground over lead C602 to lead C607. The alternate circuit to relay 430 is opened at contacts 456. However, relay 430 remains operated over contacts 437 and 233. Likewise, the circuit to relay 410 is opened at contacts 457. However, it remains operated over its previously described holding circuit.

*Security Check*

The first portion of the tape has perforated therein in sequence a start-of-message indicator comprising, for example, the characters CR CR LTR, the network or system code comprising, for example, the characters ZZ, the station code assigned to the calling or sending station comprising, for example, the characters XA and end-of-heading indicator comprising, for example, the characters CR CR LF. This information is followed by the body of the message.

Polar relay 275 is operated by the transmitter 270 in accordance with the perforations in the tape to control contacts 276 in accordance therewith. When contacts 276 are closed, coil 296 is connected in shunt with ½ the coil of tank circuit 297 to raise the output frequency of transmitter 290 to the mark frequency of 2505 cycles. When the contacts 276 are open, the output of transmitter 290 is 2425 cycles and corresponds to the space frequency. Thus, a series of frequency shifts providing mark and space conditions corresponding to the message characters are transmitted over repeat coil 490 and the L3 and L4 conductors to the called station. Simultaneously, the transmitter signals are picked up by telegraph receiver 240, as conductor R1 is connected to the left winding of repeating coil 490, and transmitted to the calling station polar relay 250. It controls the magnet 255 to provide a record of the transmitted message. The code bars of the recording apparatus controlled by magnet 255 now enable the function selector 690 in response to the start-of-message indicator in the message heading.

The "No Tone Detecting Circuit" relay 260 is also operated as a result of the amplification of grid current changes in tubes 241 and 242 resulting from the mark and space frequencies. The grid current is amplified by amplifier 262 to operate relay 260 for closing contacts 261. This terminates the charging of condenser 302. As relay 260 is operated within a very short time after the operation of relay 410, condenser 302 is not charged sufficiently to cause the collector-emitter circuit of transistor 301 to draw current for operating relay 310.

The message signals transmitted to the called station are received thereat and passed via the repeating coil 490 thereat to the associated telegraph receiver 240. The output of receiver 240 is coupled to relay 250 for operating the polar relay 250 at the called station. The received tones result in grid current changes in tubes 241 and 242, which are amplified by amplifier 262 to operate relay 260. It terminates charging of capacitor 302 at contacts 361. Polar relay 250 operates magnet 255 in accordance with received message characters to control the recording apparatus to record the transmitted message characters. The recording apparatus responds to the start-of-message indicator in the message heading to enable the function selector 690 at the called station. Signal receiver 230 does not respond to the received frequencies and relay 235 remains operated. Contacts 236 remain open, and as the bias winding of relay 250 is deenergized, the relay 250 can respond to the incoming signals.

The operation of the function selector 690 at the sending or calling station is initiated in response to the receipt of the start-of-message indicator and it is operated in accordance with the movement of the code bars on the recording apparatus. It closes the home station contacts HSC in response to the operation of the recording control magnet 255 in accordance with the sending or calling station code ZZ XA. Contacts HSC close to extend ground from contacts 323, 344, 434, and 445, lead C602 and key contacts 697 to contacts 644 and the upper winding of relay 610.

At the called station a similar operation takes place at the function selector associated with the recording apparatus thereat in response to the incoming signals operating polar relay 250 and its associated magnet 255. However, in this case, when the function selector contacts DSC close in response to the receipt of the network code ZZ and the called station code, ground is extended from contacts 448, lead C604 and key contacts 696, past contacts 643 to operate relay 630. Relay 630 closes contacts 632 to lock itself operated over lead C599 and contacts 327. At contacts 633 it opens the circuit for relay 650, which restores. This permits the transmitter clutch magnet circuit at the called station to be established over contacts 651. At contacts 634 ground is extended over lead C606 to maintain relay 330 operated, and at contacts 631 a circuit is prepared to relay 640.

At the calling or sending station the operation of relay 610 closes a holding circuit for its upper winding over contacts 612 and 641 and lead C599 to ground at contacts 327. At contacts 611 relay 610 prepares a circuit for relay 640. At contacts 613 it completes a circuit for its lower winding over contacts 623 to ground over lead C602. At contacts 614 it extends the ground from lead C602, contacts 697, past contacts 651 directly to lead C605 to operate relay 360. At contacts 615 ground is removed from lead C607 to deenergize the transmiter clutch magnet 280 and the lower winding of relay 440. Telegraph character transmission, therefore, is terminated. At contacts 616 relay 610 extends ground over lead C606 to maintain relay 330 energized.

Relay 360 at the calling station connects the tank circuit 402 to the oscillator tube 210 of the Telegraph transmitter 290 as explained for the called station. The calling station now transmits the 1740 cycle "Go Ahead" tone signal to the called station signal receiver and to its own signal receiver 230. Ground at contacts 237 is removed from relay 450. However, relay 360 at contacts 369′ maintains relay 450 operated as already explained. Relay 360 completes its own holding circuit over contacts 368, 434, 344, and 323. At contacts 368′, relay 340 is restored and it in turn restores relay 360 at contacts 344, after a predetermined time period, as explained for the called station. At contacts 341 the transmission of the "Go Ahead" signal is terminated. Contacts 369′ maintain relay 450 operated. When contacts 344 open, the circuit to the upper winding of relay 440 is opened and it restores. Relay 440, on restoring, reoperates relay 540 at contacts 449′. Relay 440 also opens contacts 445 to prevent ground from being forwarded to lead C602 when relay 340 reoperates. Thus, with ground removed from lead C602, the lower winding of relay 610 deenergizes. However, it remains operated over the circuit to its upper winding.

The 1740 cycle "Go Ahead" tone signal received at the called station results in the operation of relay 235 thereat in the explained manner. Contacts 237 open to restore relay 450 at the called station, after a predetermined time period. Contacts 236 are closed to maintain the bias winding of relay 250 energized, all in a manner similar to that explained for the calling station. When relay 360 at the calling station is restored, relay 235 at the called station is reoperated to deenergize the bias winding of relay 250. It also extends ground from contacts 237 to operate relay 440 at the called station as explained for the calling station.

A sequence of operations for operating relays 440 and 410 at the called station and releasing relay 540 and reoperating relay 450 similar to that explained for the calling station takes place in response to the "Go Ahead" signal. Ground is extended to and maintained on leads C602 and C607 to operate the transmitter clutch magnet 280 at the called station as explained for the calling station, and the tape containing similar heading information is processed at the called station. In this case the heading information in the message at the called station contains the network code as before and the called station code.

At the called station the function selector home station contacts HSC close in response to receipt of its own station code, while at the calling station, the function selector contacts DSC close in response to the receipt of the network characters ZZ and the called station code. At the called station contacts HSC extend the ground on lead C602, past contacts HSC to operate relay 610 as explained for the calling station. Relay 610 energizes its lower winding over contacts 613 and 623 and C602. It operates relay 360 at the called station through contact 614 and C602. In addition, it closes contacts 611 to extend ground over contacts 631 to energize the upper winding of relay 640. Relay 640 opens contacts 641 to open the holding circuit for the upper winding of relay 610, and at contacts 642 energizes its own lower winding over lead C599. At contacts 646 it extends ground to lead C606, and at contacts 643, 644, and 645 opens points in respective circuits to relays 630, 610, and 650.

At the calling station the receipt of the network code and the called station code causes contacts DSC to close and extend ground from contacts 448 and lead C604 to operate relay 630, as explained previously for the called station. A circuit is therefore completed to relay 640 at the calling station. It opens the circuit to the upper winding of relay 610 at contacts 641, which restores. Relay 610, therefore, opens contacts 614 to open a possible circuit to relay 360, and at contacts 615 prepares a circuit for the transmitter clutch magnet 280.

If the calling station, after having sent its own heading information, receives heading information from the called station, which is not legitimate, the DSC contacts in the function selector 690 do not close. The operator at the station, on reading the record of the heading, may recognize it as satisfactory. She then momentarily operates key contacts 693. This completes a circuit to relay 640 as contacts 611 at the calling station are already closed by relay 610. Relay 640 opens contacts 641 to open the holding circuit for the upper winding of relay 610. At contacts 642 it completes a circuit for its lower winding to ground on lead C599. At contacts 643, it opens a possible circuit for relay 630, and at contacts 644 opens a point in a possible circuit to the upper winding of relay 610. At contacts 645 a possible circuit to relay 650 is opened and at contacts 646 ground is extended over lead C606 to maintain relay 330 energized.

With relay 610 restored, the ground, which is extended to lead C602 at the calling station, in response to the "Go Ahead" signal from the called station as explained, is extended to operate relay 440 and the calling station clutch magnet as already explained. The calling station then transmits its message as will be explained.

If the heading information was not legitimate and the station is unattended or the operator ignores the same, when the sending station stops transmitting telegraph signals and where no identification of the calling station is required, the "No Tone" detecting relay 260 restores at the called station to open contacts 261. This enables condenser 302 to charge over the ten second delay circuit. When charged, relay 310 is operated to release the station in a manner which will be explained, while a similar operation takes place at the calling station. Thus, an unauthorized station is prevented from receiving messages.

If the called station is unattended and has a message which is to be sent to any calling station and where no identification of the calling station is required, the key contacts 699, 698, 697, and 696 are opened and key contacts 692 closed. Ground, which is placed on lead C602 at the unattended station, as explained in response to "Go Ahead" signal from the calling station, will therefore be extended past contacts 692 and tape-out contacts 694 to lead C607 to operate relay 440. It will release relay 540 to operate the clutch magnet 280 to initiate transmission, as explained.

In the case where an unattended station does not have any messages to transmit, but is to receive messages from other stations, an endless tape is prepared and placed in the transmitter at the unattended station. This tape has the following heading information, for example,

CR CR LTR NM ZZ XA CR CR LF

Everything progresses as described previously except that when the called unattended station transmits its message heading, the NM code characters cause the function selector contacts NMC at each staiton to close. This extends the ground from lead C602 past contacts 697 to the lower winding of relay 620 at the unattended station. At the attended station, no ground is placed on lead C602 during transmission from the called station so relay 620 thereat does not operate.

Relay 620 at the called unattended station closes contacts 621 to energize its upper winding from ground on lead C599. At contacts 622 it prepares a new holding circuit for the lower winding of relay 610. Relay 610 at the unattended station then operates in response to the unattended station code XA in its own heading. Relay 610 energizes its lower winding over contacts 613 and 622 and also causes the transmission of a "Go Ahead" signal to the calling station. It also operates relay 640 as previously described. However, relay 640 cannot now release relay 610, as it is held operated over contacts 622 and 613. Message transmission from the calling station will now proceed as will be described.

*Message Transmission*

After receiving its own station code, relay 610 at the called station operates as previously explained. It extends ground on lead C602 over contacts 614 to lead C605 to operate relay 360. At contacts 615 it deenergizes the clutch magnet 280 and the lower winding of relay 440, and at contacts 611 operates relay 640, as explained. The called station now transmits a "Go Ahead" signal under control of relay 360 as before described. Relay 360 restores relay 340, after a period of time, and that relay in turn restores relays 440 and 360, as explained. In addition, ground is removed from lead C602 to restore the lower winding of relay 610, which now restores to prepare a circuit to the clutch magnet at contacts 615 and open a point in the circuit to relay 360 at contacts 614. Relay 440 in turn reoperates relay 540, while relay 410 remains operated over its holding circuit as explained.

At the calling station the receipt of the "Go Ahead" tone signal causes restoration of relay 235 as previously explained. At the termination of the signal, relay 440 is operated as previously explained to in turn restore relay 540 and complete the circuit for the clutch magnet 280 at the calling station. The transmitter 270 is again operated as explained, and the message is transmitted. The end of heading characters in the message are now processed and the function selector at each station is rendered non-responsive to further message characters in response thereto. Relay 360 remains unoperated, as no circuit can be completed thereto. At the end of message transmission, the tape has been passed through the transmitter and the tape-out contacts 694 open to restore the clutch magnet circuit by removing ground from lead C607. This terminates operation of the calling station transmitter.

When the tape at the calling station has been processed, tape-out contacts 695 close to extend the ground on lead C602 over already described contacts to lead C605 and relay 360. Relay 360 energizes to cause the 1740 cycle "Go Ahead" signal to be transmitted to the called station, as explained. Relay 340 restores under control of relay 360, and it in turn restores relay 360 to terminate the signal.

At the called station the receipt and termination of the 1740 cycle "Go Ahead" signal results in the operation of relay 440 as previously explained, and it, in turn, deenergizes relay 540 to extend ground from lead C602 and lead C607 in the previously explained manner to operate the transmitter clutch magnet 280 at the called station. Relay 360 remains unoperated, as relay 610 is still unoperated. The message at the called station is now transmitted to the calling station, and when the tape has been passed through the transmitter, the tape-out contacts 694 open to terminate operation of the transmitter clutch magnet 280. In the event of an unattended called station whereat relay 610 was held operated, the receipt of the "Go Ahead" signal from the calling station simply results in ground on lead C602 being extended over contacts 614 to operate relay 360. If the called station has no message to transmit, or if its tape has been passed through the transmitter, the tape-out contacts 695 are closed. This extends ground on lead C602 to lead C605 and operates relay 360. Relay 360 initiates the transmission of the "Go Ahead" signal to the calling station as previously explained.

Under normal circumstances the calling station will not have another message to transmit, but if it does, it will transmit as before described in response to the receipt of the "Go Ahead" signal, as its tape-out contacts 694 will then be closed. If it has no other message to transmit, a circuit is completed to relay 360 over the aforementioned tape-out contacts 695 in response to the termination of the "Go Ahead" signal from the called station reoperating relay 440 and restoring relay 540. The called station will receive the "Go Ahead" signal, and, likewise, if it has no message to transmit, will return a "Go Ahead" signal to the calling station.

During message transmission relay 260 at each station is held operated by the transmitted space and mark frequencies to maintain contacts 261 closed. This prevents condenser 302 from charging during message transmission.

On cessation of message signals relay 260 at each station restores to open contacts 261. As relay 410 at each station is operated, condenser 302 at each station charges from negative battery, through resistors 309, 308, 307, and 303, contacts 411 and 421, and resistor 305. A back and forth sending of the "Go Ahead" signals will therefore continue, after message transmission is completed, for approximately ten seconds. At that time condenser 302 has been changed over the just described circuit to bias the base circuit of transistor 301 to pass current. Current then flows in the collector-emitter circuit of transistor 301 at each station to operate relay 310 at each station.

Relay 310 at each station, on operating, extends the ground from contact 442 past contacts 311 to operate relay 320 at its respective station. Relay 320 at the called station opens contacts 321 to release relay 520 at the called station, which opens a D.C. loop to the central office equipment at contacts 521. At contacts 323 relay 320 at whichever station is transmitting a "Go Ahead" signal, removes the operating ground for relays 440 and 360 so that they restore and the signal is terminated. Contacts 324 open without effect at this time. Contacts 325 close to complete another circuit over contacts 333 for normally operated relay 430 at each station. At contacts 326 relay 510 at the calling station is restored to open the loop circuit to the switching equipment, which restores in any well known manner. At contacts 327 the holding circuit for relay 530 at the called station is opened and the holding circuit for relay 640 at both stations is opened. If relay 620 at one station is operated, it is restored when ground is removed from lead C599. At contacts 328 relay 410 at each station is restored. With relays 640, 440, and 510 or 530 respectively restored to open contacts 645, 442, 514, and 531 respectively, both relays 330 and 320 restore. Relay 330 places ground on condenser 302 to terminate operation of relay 310. Both stations are now in their idle condition and relays 340 and 450 are held operated over their respective operating circuits.

In an automatic system of the above described type it is necessary to guard against a calling station in another network receiving unauthorized or secret information from a called station. To prevent the unauthorized receipt of a message from a called station in another network than the calling station, the function selectors at each station are provided with home station contacts HSC and distant station contacts DSC which must be operated before message information can be automatically transmitted between the calling and called stations.

It will be remembered that relay 650 at the called station was operated over conductor 603 when relay 530 operated and closed contacts 533. Relay 650 opened contacts 651 to prevent the operation of relay 440 at the called station in case the distant station contacts DSC at the called station are not closed. The distant station contacts DSC at the called station are operated only in case another station in the same network of stations originated the call. In the event contacts DSC fail to close when the calling station transmits its own network code and station code then no circuit is completed for operating relay 630 as previously described. For example, if the calling station is in another network, which is not entitled to receive messages from this called station, then the distant station contacts DSC are not closed. Under these conditions where the second go-ahead signal from the calling station is terminated realy 235 closes contacts 237 to extend ground by way of contacts 451, 504 and conductors 602, 697, closed contact 652 on operated relay 650, conductor 605 to operate relay 360, instead of operating relay 440. Since relay 440 at the called station is not operated then relay 540 is maintained operated with the result that the called station does not transmit any character signal codes back to the calling station and the function selector at the calling station is not operated to close its distant station contacts DSC.

The operation of relay 360 at the called station now transmits a (third) go-ahead signal to the calling station causing relay 235 at the calling station to restore. However, since no character signals were sent from the called station function selector at the calling station does not operate with the result the relays 630 and 640 do not operate and relay 610 is now maintained operated. When relay 610 does not restore the circuit to relay 440 is opened at contact 615 when relay 235 is operated at the termination of the third go-ahead signal to close ground at 237 over 451, 504, 602, 697, 651, 614, 605 to operate relay 360 at the calling station instead.

Since relay 440 at the calling station is not operated the transmitter clutch magnet 280 of the calling station is not operated by the continued operation of relay 540 with the result that the calling station cannot transmit the remainder of the message.

Relay 360 at the calling station transmits a fourth go-ahead signal to the called station as previously described.

The 10 second time delay circuit is now effective, since no message characters are being transmitted, to automatically release the connection as previously described. Unauthorized stations in one network, therefore, cannot automatically send and automatically receive telegraph messages from stations in another network.

*Control Functions*

An operator at either station, on desiring to converse with the other, to inform her, for example, of a fault condition, momentarily operates the alarm key to close contacts 502 and 503. This extends ground to relays 340 and 350 respectively. Relay 340 will therefore receive another energizing spurt or be operated in the event relay 360 is operated. This ensures a full release period therefor.

Relay 350 closes contacts 359 to complete its own holding circuit to contacts 427. At contacts 358 relay 350 opens the circuit for relay 340 so that relay 340 starts to restore. When restored, it restores relay 440 and clutch magnet 280 or relay 360, if any are operated, as before explained, to complete already described functions. At contacts 359' relay 350 completes a circuit for holding relay 450 operated. At contacts 351 and 353 resistor 295 is removed from the feedback circuit of oscillator tube 210, and at contacts 352 and 354 resistor 403 is placed in the feedback circuit. At contacts 355 tank circuit 294 is disconnected from the oscillator tube 210 and at contacts 356 tank circuit 401 is connected to the oscillator tube 210. At contacts 357 repeat coil 490 is connected to the output of transmitter 290.

The transmitter 290 now provides 1620 cycle "Alarm" signal to the repeat coil 490 and the L3 and L4 conductors extending to the other station. This signal is likewise picked up at the station at which it is generated and applied through signal receiver 230 to restore the low tone relay 231. Relay 231, on restoring, closes contacts 232 to energize the bias winding of the polar relay 250. At contacts 233 relay 231 opens the circuit to relay 430, which starts to restore. The receipt of the "Alarm" signal at the other station causes a similar operation there.

Relay 430 at each station, therefore, restores after a period of time determined by the condenser resistor network 461 connected thereto over contacts 436 to close contacts 433 and terminate the charging of condenser 302 at each station. At contacts 431 the telephone transmitter 595 is connected across the L3 and L4 conductors so that the operators can converse with each other, while at contacts 432, resistor 584 is disconnected from across the line. At contacts 435 the condenser resistor network 461 for holding relay 430 operated is disconnected therefrom, and at contacts 436 a charging circuit is provided therefor. At contacts 434 relay 430 opens a point in the circuit for providing ground to the clutch magnet 280, relay 440, and to relay 360. Thus, if the transmitter 270 or relay 360 at the station, which received the alarm, are operated, their respective operations are terminated. At contacts 437 relay 430 restores a point in its own circuit, and at contacts 438 opens a circuit to relay 420.

When relay 340 at the station which is transmitting the alarm restores, it opens contacts 341. This disconnects the output of transmitter 290 from coil 490 to terminate the transmission of the "Alarm" signal to the signal receiver 230 at both stations. Relay 231 at each station, therefore, reoperates to extend ground over contacts 233 and 438 and thus operates relay 420 at each station.

Relay 420 closes contacts 424 to retain relay 330 operated, and at contacts 426 extends ground past contacts 367' to operate alarm lamp 564 at each station. This ground is also extended past hookswitch contacts 569 to operate buzzer 568 at each station. At contacts 427 the holding circuit for relay 350 is opened and it restores to reoperate relay 340. At contacts 429 relay 420 reoperates relay 430 from ground at contacts 233. Relay 430 opens the circuit to relay 420 at contacts 438. However, at contacts 428 relay 420 has completed a holding circuit over contacts 455 and 366' to ground at contacts 324. With relay 340 reoperated, contacts 345 are placed in shunt contacts 366'. At contacts 429' ground is maintained on the bias winding of polar relay 250. At contacts 421 a point in the 10 second time constant circuit for charging capacitor 302 is opened, and at contacts 422 the one minute delay circuit for charging condenser 302 is completed from negative battery, resistors 309, 308, 307, and 306, through contacts 422 and resistor 305.

The operator at the respective stations, on hearing the buzzer 568 or on seeing lighted lamp 564, operates hookswitch contacts 569 to terminate operation of the buzzer and hookswitch springs 567 to place ground through contacts 423 on condenser 302. This terminates charging of the condenser 302 before one minute has expired.

The operators now converse, and when the reason for conversation has been take care of, the operator at either station momentarily operates the "Go Ahead" key contacts 501. This extends operating ground to relay 360, which initiates transmission of the "Go Ahead" signal and opens contacts 368' to restore relay 340. When relay 340 restores, it terminates the "Go Ahead" signal and opens contacts 345. As contacts 366' are open, until relay 360 restores, the holding circuit to relay 420 is opened and it restores. At the other station, relay 450 releases in response to the "Go Ahead" signal to open contacts 455 and restore relay 420. Normal transmission is now either initiated or resumed as the case may be in a described manner. In addition, each operator returns the hookswitch contacts 567 and 569 to normal.

If one of the stations is unattended and an alarm condition originated at one of the stations, the operator at the attended station operates key contacts 502 and 503, as before described, to transmit the "Alarm" signal to the unattended station. An aforedescribed sequence of operations takes place. If the alarm condition can be or is cleared, the operator at the attended station also operates "Go Ahead" key contacts 501 and the "Go Ahead" signal is transmitted as described. This causes the restoration of relay 450 at the unattended station. It opens contacts 455 to restore relay 420. The unattended station will now either transmit its message or return a "Go Ahead" signal in an explained manner, depending on the situation.

If the alarm condition cannot be cleared, for example, a torn tape at the unattended station, the operator at the attended station, on making a determination of the trouble, sends the "Alarm" signal, as before described. Relay 420 is operated as before described and condenser 302 therefore charges at the unattended station from negative battery, resistor 309, 308, 307, and 303, contacts 422 and resistor 305. At the unattended station the hookswitch contacts 567 remain open to enable condenser 302 to charge for a full minute. With condenser 302 charged, the collector-emitter circuit of transistor 301 draws current to operate relay 310, which operates relay 320 through contacts 311. Relay 420 is released at contacts 324. Relay 310 also releases the station from the line as previously explained.

If the attended station has a message to transmit to the unattended station, she will now recall the unattended station after first setting her tape in the transmitter so that no heading information is transmitted, or by operating key contacts 692 to the closed position and opening key contacts 696, 697, 698, and 699. When the unattended station transmits the "Go Ahead" signal in response to the establishment of the connection, the message at the attended station will be immediately transmitted, if the tape is without heading information or if it has been placed in the transmitter with the heading information beyond the transmitter sensing pins. If the heading information is transmitted while key contacts 692 are closed, ground on lead C602 maintains the transmitter clutch magnet operated and relay 610 fails to operate. Thus, no "Go Ahead" signal is transmitted to the called unattended station and it therefore does not transmit.

In the event it is desirable to discuss a message before transmitting it, the SOM alarm key contacts 504 are opened and contacts 505 are closed. The connection is established to the called station, as described and "Go Ahead" signal is transmitted from the called station as before. But now, instead of starting the transmitter at the calling station, ground is extended over contacts 505 to operate relay 350. The "Alarm" signal is now transmitted to the called station to cause the operator thereat to answer as described. The message is now discussed, and if desired, transmission initiated as described.

What is claimed is:

1. In a telephone system, a calling station, a called station, means for automatically establishing a connection from said calling station to said called station and for signaling said called station, telegraph signaling means at said calling station arranged to transmit a telegraph message comprising a network code and a station code individual to said calling station, telegraph transmitting means at said called station arranged to transmit a telegraph message comprising said network code and a station code individual to said called station, means at said called station operated responsive to the establishment of said connection and the signaling of said called station for signaling said calling station over said connection, means at said calling station operated responsive to said signaling for operating the telegraph signaling means thereat to transmit said network code and said station code, means at said calling station operated responsive to the transmission of said station code for terminating transmission from said calling station and for signaling said called station, means at said called station operated responsive to the receipt of said network code and said signal for operating the telegraph signal means thereat to transmit the network code and the station code individual to said called station, means at said called station operated responsive to the receipt of said station code for signaling said calling station, and means at said calling station operated responsive to the receipt of said network code and said last signal for operating said telegraph signaling means thereat to transmit a telegraph message to said called station.

2. The system as claimed in claim 3 including means for automatically releasing said established connection in response to the termination of message transmission by said telegraph signal means.

3. The system as claimed in claim 1 wherein all stations in the same network have the same network code followed by their individual station code, including means for disabling said telegraph signal means at said called station to prevent the transmission of the network code and station code individual to said called station in case the receipt of said network code transmitted from said calling station indicates a calling station in another network.

4. The system as claimed in claim 3 including means controlled by said disabling means for signaling said calling station over said connection.

5. The system as claimed in claim 4 including means operated in response to said last mentioned signaling of the calling station by said called station in case said called station telegraph signal means fails to transmit said network code and station code of said called stations for preventing the operation of said telegraph signal means to transmit the message from the calling station.

6. In combination with a telephone system of the type wherein a calling and a called station are each equipped with telegraph signalling equipment and wherein ringing current is extended to said called station on the establishment of a connection thereto; apparatus at said called station automatically responsive to the receipt of said ringing current thereat for transmitting a go-ahead signal over said connection to said calling station; means at said calling station responsive to the receipt of said go-ahead signal for automatically operating said telegraph signalling equipment at said calling station for transmitting a first predetermined sequence of telegraph signals followed by a go-ahead signal to said called station; a first means at said called station operative only in response to the receipt of said first predetermined sequence of signals; a second means at said called station operative in response to said go-ahead signal, whenever received after said first means is operated, for automatically operating said telegraph signalling equipment thereat to transmit a telegraph message to said calling station.

7. The combination as claimed in claim 6, wherein said telegraph message transmitted to said calling station comprises a second predetermined sequence of telegraph signals followed by a go-ahead signal, and wherein there is provided second means at said calling station operative only in response to the reception of said second predetermined sequence of signals, and a third means at said calling station automatically operative in response to last said go-ahead signal, whenever received after said second means is operated, to transmit a telegraph message to said called station over said connection.

8. The combination as claimed in claim 7, wherein said third means at said calling station includes apparatus for transmitting a go-ahead signal in the event said calling station has no telegraph message for transmission.

9. The combination as claimed in claim 7, wherein there is further provided manually operable means at each of said stations for transmitting an alarm signal to the other of said stations, and means at both said stations automatically responsive to said alarm signal for terminating immediately said telegraph message.

10. The combination as claimed in claim 7, wherein there is provided means operable at one of said stations for terminating transmission of telegraph signals and for transmitting an alarm signal to the other station, and other means thereafter operable for operating the telegraph signalling equipment to initiate telegraph message transmission.

11. A system such as claimed in claim 10, including means automatically operated a predetermined time after said alarm signal is transmitted for releasing said stations from said connection in the event said other means remain unoperated.

12. The combination as claimed in claim 7, wherein there is provided further means at said calling station automatically operated only in response to the termination of the last-mentioned telegraph message for transmitting a go-ahead signal to said called station over said connection.

13. The combination as claimed in claim 12, wherein said second means at said called station is automatically responsive only to the reception of the last-mentioned go-ahead signal for transmitting a telegraph message to said calling station over said connection.

14. The combination as claimed in claim 13, wherein said second means at said called station includes apparatus for transmitting a go-ahead signal in the event said called station has no telegraph message for transmission.

15. The combination as claimed in claim 13, wherein there is provided further means at said called station automatically operated only in response to the termination of said telegraph message to said calling station for transmitting a go-ahead signal to said calling station over said connection.

16. The combination as claimed in claim 15, wherein at each of said stations said means, which are automatically responsive to the receipt of said go-ahead signal from the other of said stations, includes apparatus for transmitting a go-ahead signal to said other station in the event no telegraph message is to be transmitted, whereby in the event neither of said stations has a telegraph message to be transmitted successive go-ahead signals are transmitted between said stations; and wherein there is further provided means operative after said successive go-ahead signals have been received for a predetermined period of time to automatically release said connection.

17. In a telephone system, a calling station, a called station, means for establishing a connection from said calling station to said called station, calling station transmitting means, called station transmitting means, means responsive to the establishment of said connection for operating said calling station transmitting means to transmit calling station identification codes identifying the network of stations including said calling station over said connection to said called station, called station receiving means operated in response to the receipt of said calling station identification codes for identifying the network including said calling station and for operating said called station transmitting means to transmit called station identification codes identifying the network including said called station over said connection to said calling station, calling station receiving means operated in response to the receipt of said called station identification codes for identifying the network including said called station, means operative in case said transmitted identification codes indicate that said calling and called stations are included in the same network of stations for causing said calling and called station transmitting means to transmit telegraph messages over said connection, and other means operative in case said transmitted identification codes indicate that the calling and called stations are in different networks and are unauthorized to transmit and receive telegraph messages between such stations for automatically preventing the transmission of telegraph messages between such stations.

18. In a telephone system, a calling station, a called station, means for automatically establishing a connection from said calling station to said called station and for automatically signaling said called station, control signal transmitting means and character signal transmitting means at each said station, control signal receiving means and character signal receiving means at each said station, preset heading means at each said station having character signal codes designating a start-of-message code, a network code, an individual station code, and an end-of-message code; said network code with said station codes designating all the stations included in the network which are permitted to automatically send and automatically receive messages from such network stations; a function selector at each said station, means at said called station operated in response to the establishment of said connection and the signaling of said called station for operating said called station control signal transmitting means to transmit a first go-ahead signal over said connection to said calling station, said control signal receiving means at said calling station operated responsive to the receipt of said first go-ahead signal for operating said calling station character signal transmitting means to transmit its first portion of said heading character codes comprising the start-of-message code, the network code, and the individual calling station code to said calling station character signal receiving means and over said connection to said called station character signal receiving means, said calling station character signal receiving means operated responsive to the receipt of said transmitted network and calling station codes for operating the calling station function selector to stop further character signal transmission by said calling station character signal transmitting means and for thereafter operating said calling station control signal transmitting means to transmit a second go-ahead signal over said connection to said called station, said called station character signal receiving means operated in response to the receipt of said transmitted network and calling station codes for operating said called station function selector to operate said called station character signal transmitting means to transmit its first portion of said heading character codes comprising the start-of-message code, the network code, and the individual called station code to said called station character signal receiving means and over said connection to said calling station character signal receiving means, said called station character signal receiving means operated responsive to the receipt of said transmitted network and called station codes for operating said called station function selector to stop further character signal transmission by said called station character signal transmitting means and for thereafter operating said called station control signal transmitting means to transmit a third go-ahead signal over said connection to said calling station, said calling station control signal receiving means operated responsive to the receipt of said third go-ahead signal for operating said calling station character signal transmitting means to transmit the remainder of its heading character codes and then the body of the message, said calling station control signal transmitting means operated after transmission of the body of the message to transmit a fourth go-ahead signal over said connection to said called station, and said called station control signal receiving means operated responsive to the receipt of said fourth go-ahead signal for operating said called station character signal transmitting means to transmit the remainder of its heading character codes followed by the transmission of the body of a message in case such a message is to be sent to said calling station.

19. The combination as claimed in claim 18 including means at said called station for disabling the operation of said called station character signal transmitting means in the event that the network code received by said called station character signal receiving means from said calling station indicates a calling station in a different network unauthorized to receive messages from said called station to thereby terminate message character signal transmission.

20. The combination as claimed in claim 19 including a timing device operated a predetermined time after termination of said message character signal transmission, and releasing means controlled by the operation of said timing device for automatically releasing said established connection.

21. The combination as claimed in claim 20 wherein said disabling means in said called station includes distant station contacts in said called station function selector which fail to operate in response to the receipt of said different network code indicating an unauthorized calling station in a different network.

22. In a telephone system, an automatic telephone exchange, a plurality of stations each having a 2-wire line terminating in said exchange; means for selectively and automatically establishing a connection over the 2-wire line of a calling one of said stations, through said exchange, and over the 2-wire line of a desired called one of said stations and for transmitting ringing current to said one called station; a first and a second telegraph transmitting means in each of said stations for transmitting outgoing telegraph messages, a first and a second telegraph receiving means in each of said stations for receiving and recording incoming telegraph messages, first means at each station, when such station originates a call and is the calling station, operated to connect the second of said telegraph receiving means to the 2-wire line individual to said station; second means at each station, when such station is the called station in said established two wire connection, operated responsive to the receipt of said ringing current for connecting said first telegraph receiving means thereat to said 2-wire connection and for operating said second telegraph transmitting means thereat to transmit a telegraph message back over said established 2-wire connection to the calling station; and third means at each station, when such station is the calling station in said established 2-wire connection, operated by said connected second telegraph receiving means in response to the receipt of the incoming telegraph message from said called line to record the incoming telegraph message from the called station and for operating said first telegraph transmitting means thereat to transmit an outgoing telegraph message over said established 2-wire connection to said called station simultaneously with the transmission of the telegraph message being transmitted from said called station over said 2-wire connection.

23. A telephone system as claimed in claim 22 wherein said first means includes a calling relay having contacts for operatively connecting said second telegraph receiving means to said 2-wire line, and wherein said second means includes a called relay having contacts for operatively connecting said first telegraph receiving means to said 2-wire line and having contacts for operating said second telegraph transmitting means.

24. A telephone system as claimed in claim 23 wherein said third means includes additional relay means operated by said connected second telegraph receiving means, and contacts operated by said relay means for operating said first telegraph transmitting means.

25. In a telephone system, a central office automatic telephone exchange, a plurality of stations each having an automatic dial, telegraph signal transmitting means and telegraph signal receiving means included in each of said stations, a 2-wire line terminating each said station in said exchange, first means at a calling one of said station responsive to originating an outgoing call for bridging said calling station dial across the 2-wire line of said calling station, telephonic switches in said exchange operated over said 2-wire line of said calling station in response to the operation of said calling station dial in accordance with the telephone number of a desired called station for establishing a connection to the 2-wire line of said called station, ringing means in the last operated one of said switches transmitting ringing current over said called station 2-wire line to said called station in response to said establishment of said connection, second means at said called station operated in response to said ringing current for conditioning said called station receiving means to receive telegraph messages and for operating said called station telegraph transmitting means to transmit a telegraph message over said established 2-wire connection to said calling station, and third means including said telegraph receiving means at said calling station operated in response to the receipt of said telegraph message transmitted from said called station for operating said telegraph transmitting means at said calling station to transmit a telegraph message over said established 2-wire connection to said called station simultaneously with the transmission of the telegraph message from said called station to said calling station.

26. In a telephone system of the type wherein a calling and called station are each equipped with telegraph transmitting and receiving equipment and with individual station identification means and wherein ringing current is extended to said called station on the establishment of a connection thereto, the improvement comprising means at the called station automatically operated in response to the receipt of ringing current thereat for transmitting a signal over said connection to said calling station, means at said calling station operated responsive to the receipt of said signal for operating the telegraph signalling equipment and said calling station individual identification means at said calling station for transmitting a predetermined sequence of coded telegraph signals identifying said calling station to said called station, means at said called station operated responsive to the receipt of said predetermined sequence of coded signals identifying said calling station for operating the telegraph transmitting equipment thereat for transmitting a predetermined sequence of coded telegraph signals identifying said called station to said calling station, said predetermined sequence of coded telegraph signals of said calling and called stations indicating that both said calling and called station are in the same network of stations, and means operated in case said calling station transmits a different predetermined sequence of telegraph signals indicating that said calling station is in a different network for disabling the operation of said telegraph transmitting means at said called station and prevent transmission of a telegraph message to said calling station.

27. In combination with a teelphone system of the type wherein a calling and a called telephone station are each provided with telegraph signalling equipment and wherein, upon the extension of a connection from said calling station to said called station a ringing signal is transmitted to said called station; means at said called station automatically responsive to said ringing signal to transmit an acknowledgement signal to said calling station over said connection; individual identifying means at said calling station, means at said calling station responsive to the receipt of said acknowledgement signal for automatically operating said telegraph signalling equipment and said calling station individual identifying means thereat to transmit a telegraph message comprising coded characters identifying said calling station to said called station over said connection, means included in said ringing signal for automatically operating said telegraph signalling equipment at said called station to transmit a telegraph message to said calling station after said acknowledgement signal is transmitted to said calling station, and means at said called station for disabling the operation of said telegraph signalling equipment at said called station in the event that said calling station is in a different network of stations than said called station thereby stopping further telegraph message transmission.

28. In a telephone system of the type wherein a calling station is equipped with telegraph transmitting equipment for transmitting a network code and its own station code to a called station in the same network responsive to the completion of a call from said calling station to said called station and said called station is equipped with telegraph transmitting equipment for transmitting the same network code and its own individual station code to said calling station, the improvement comprising means at said called station operated only in response to the receipt of a network code and said calling station code from said calling station indicating that said calling station is in the same network as said called station for enabling said telegraph transmitting equipment at said called station to transmit said network code and said called station code to said calling station, an identification key at said called station, having a first and a second position, means effective when said identification key is in its first position requiring the calling station to identify itself as being in the same network as said called station before the called station can transmit its telegraph message, and means effective when said identification key at said called station is in its second position for enabling said called station to transmit its telegraph message to any calling station without said calling station being required to identify itself at said called station.

References Cited in the file of this patent

UNITED STATES PATENTS

| | | |
|---|---|---|
| 1,895,112 | Vernham | Jan. 24, 1933 |
| 2,088,750 | Kinkead | Aug. 3, 1937 |
| 2,752,414 | Przysiecki | June 26, 1956 |
| 2,828,362 | Darwin et al. | Mar. 25, 1958 |
| 2,881,251 | Strip | Apr. 7, 1959 |
| 2,919,307 | Bachelet et al. | Dec. 29, 1959 |